United States Patent
Ju

(10) Patent No.: US 10,397,630 B2
(45) Date of Patent: Aug. 27, 2019

(54) APPARATUS FOR PROVIDING, EDITING AND PLAYING VIDEO CONTENTS AND THE METHOD THEREOF

(71) Applicant: Hyun Sun Ju, Seongnam-si (KR)

(72) Inventor: Hyun Sun Ju, Seongnam-si (KR)

(73) Assignee: VEAVER, INC. (KR)

( * ) Notice: Subject to any disclaimer, the term of this patent is extended or adjusted under 35 U.S.C. 154(b) by 67 days.

(21) Appl. No.: 14/907,816

(22) PCT Filed: Jul. 23, 2014

(86) PCT No.: PCT/KR2014/006679
§ 371 (c)(1),
(2) Date: Jan. 26, 2016

(87) PCT Pub. No.: WO2015/012581
PCT Pub. Date: Jan. 29, 2015

(65) Prior Publication Data
US 2016/0191975 A1    Jun. 30, 2016

(30) Foreign Application Priority Data

Jul. 26, 2013 (KR) .................. 10-2013-0088837
Jul. 26, 2013 (KR) .................. 10-2013-0088846

(51) Int. Cl.
*H04N 21/2743* (2011.01)
*H04N 21/414* (2011.01)
(Continued)

(52) U.S. Cl.
CPC ....... *H04N 21/2743* (2013.01); *G11B 27/031* (2013.01); *G11B 27/034* (2013.01);
(Continued)

(58) Field of Classification Search
CPC ......... H04N 21/2743; H04N 21/85406; H04N 21/4788; H04N 21/8456; H04N 21/41407;
(Continued)

(56) References Cited

U.S. PATENT DOCUMENTS

2008/0103023 A1* 5/2008 Chung ................. G11B 27/034
                                                              482/3
2010/0260468 A1* 10/2010 Khatib ................ G06F 11/0757
                                                              386/278
(Continued)

FOREIGN PATENT DOCUMENTS

JP  2007089186 A  4/2007
JP  2010067325 A  3/2010
(Continued)

OTHER PUBLICATIONS blog.naver.com/mistyluv78/130172314365, Jun. 17, 2013, 1 page.

*Primary Examiner* — Junior O Mendoza
(74) *Attorney, Agent, or Firm* — Renaissance IP Law Group LLP

(57) ABSTRACT

The present invention relates to an apparatus for providing, editing, and playing video contents and the method thereof, which provide an application program allowing a user to produce contents made by one's own producing and editing and also playing the video contents; a video contents provision platform for selling and purchasing the video contents based on social network services; and a device of controlling the playback of the original video content file and the method thereof, being capable of storing the video content editing information as an additional data file while keeping the original video content stream intact.

6 Claims, 17 Drawing Sheets

(51) Int. Cl.
*H04N 21/845* (2011.01)
*H04N 21/8543* (2011.01)
*G11B 27/034* (2006.01)
*H04N 21/4788* (2011.01)
*H04N 21/854* (2011.01)
*G11B 27/031* (2006.01)

(52) U.S. Cl.
CPC ... *H04N 21/41407* (2013.01); *H04N 21/4788* (2013.01); *H04N 21/8456* (2013.01); *H04N 21/8543* (2013.01); *H04N 21/85406* (2013.01)

(58) Field of Classification Search
CPC . H04N 21/8543; G11B 27/031; G11B 27/034
See application file for complete search history.

(56) References Cited

U.S. PATENT DOCUMENTS

| | | | |
|---|---|---|---|
| 2012/0331168 A1* | 12/2012 | Chen | H04L 67/1097 709/231 |
| 2014/0289057 A1* | 9/2014 | Kowal | G06Q 30/0277 705/14.73 |
| 2014/0297717 A1* | 10/2014 | Grossman | H04L 67/10 709/203 |

FOREIGN PATENT DOCUMENTS

| | | |
|---|---|---|
| JP | 2010081277 A | 4/2010 |
| KR | 20050019176 A | 3/2005 |
| KR | 20090038004 A | 4/2009 |
| KR | 20120067830 A | 6/2012 |
| KR | 20120095523 A | 8/2012 |

* cited by examiner

<Concept for sharing other users' contents according to Follow>

<Types of supporting contents from other users' contents lists>

(a. Choreography(Dance) video chart I/F)

(b. Choreographers(Dancers) (dancer I/F)

(a) Video contents editing process (b) Video contents playing process

APPARATUS FOR PROVIDING, EDITING AND PLAYING VIDEO CONTENTS AND THE METHOD THEREOF

FIELD OF THE INVENTION

The present invention relates to an apparatus for providing, editing, and playing video contents and the method thereof, more specifically, which provides an application program allowing a user to produce contents made by one's own producing and editing and also playing the video contents; a video contents provision platform for selling and purchasing the video contents based on social network services; and a device of controlling the playback of the original video content file and the method thereof, being capable of storing the video content editing information as an additional data file while keeping the original video content stream intact.

BACKGROUND OF THE INVENTION

Due to economic depression and social instability, the market of dance school including broadcasting dance school, yoga school, etc. has decreased rapidly, which was once flourished as a society was more developed and people's awareness of culture and life was broadened. In addition, the traditional trend to learn offline choreography directly from choreographers has changed to learn anytime and anywhere by watching videos with personal portable devices, as various media are developed so as to allow users to learn choreographic motion such as yoga motion, exercise motion, dance motion etc. by playing videos in smart devices such as smartphones or tablet PCs.

In addition, as it was a big issue recently that a famous singer purchased the copyright of specific choreographic act from another singer, it is widely accepted in society that the choreography, as independent creative work not an element subordinate to music, has its own merchantability independently of music. Considering this circumstance, it is required to develop a service to produce choreography in the form of a video that can be consumed by a user using personal portable devices.

In addition, traditionally creating choreography such as dance or yoga motion depends on one's memory and choreographers are required to teach their created choreographic motions to people by offline demonstrations. While choreographers can use the Labanotation dance notation to describe every choreographic motion for creating choreography or teaching to other people, it is difficult to use effectively the Labanotation dance notation because an ordinary user has difficulty to study additionally the notation in order to understand choreographic motions and the expressive capability of the notation is notably lower than that of a video.

Thus, recently a video recorder is used to create choreography by recording choreographic motions and the choreography in recorded videos is used for teaching, but the use of video recorder has the following problems: it is required to buy the video recorder for recording choreographic motions; a choreographer commits a lot of intermediate processing and expenditure in producing and distributing videos; the choreographer can hardly get feedback from users on the produced choreography since the relationship between them is unilateral; additionally users have difficulty to search appropriate choreography videos that they want.

In addition, when ordinary users other than professional choreographers create and share choreography and want to get feedback on it from other users, they can only post their created choreographic videos on internet cafes or blogs and no organized system in which they can distribute the videos efficiently does not yet exist.

As a new paradigm in creating and consuming choreography is required due to the circumstances described above, the purpose of the present invention is to provide convenient functions for choreographers to produce standardized video contents, to immediately distribute their created videos to users, and to additionally identify users' feedback promptly; and the purpose of the present invention is to provide for ordinary users other than professional choreographers to create and distribute choreographic motions easily so as to present an interactive video content delivery platform.

In addition recent smart devices provide various functions including photo and video recording, data communications, multimedia video playback in addition to the conventional mobile communications. In particular, mobile devices equipped with additional flash memory can record and save video more than 1 hour continuously, download and store a large number of video files with data communications, and thus numerous application programs are introduced with the development of these technologies. These video contents include movie, music, music video, video lecture, broadcasting program, etc. and the kinds of these contents are broad and diverse; the format of these contents differs depending on the source of video contents so that a lot of memory is required in the video editing process and converting video contents to the same format is burdensome.

On the other hand, users have various needs to edit video files when using the video files. For example, a user may want to play only a desired section of the recorded video for a long time; the user wants to repeat and play only the extracted part taken from many video files to acquire desired effect. In addition, the user may want to insert an explanation for each extracted part taken from the above video files and want to edit the video files depending on the various playback options (e.g. playback speed, playback delay, repeated playback, etc.) according to the user's convenience.

However, the video editing techniques used in conventional mobile devices provides functions to simply add new objects to the said video file while the video file itself remains intact or to store a new file by deleting some parts of the video file itself.

Recently the video editing technique using SMIL (Synchronized Multimedia Integration Language) is used in smart devices; a user may edit the video file by inserting texts or images into it using this technique.

However, the above previous techniques have a problem, not being capable of providing video content file editing technique to preserve the original video content file intact, not to occupy additional memory, and to play only specific sections of the video content file, etc.

In addition, in order for a user to learn and practice the content of video effectively as much as possible, the conventional technique sets up sections based on the content of video and groups the sections, if necessary, while keeping the original video content file itself intact; thus an editing technique of the said video content file in a systematic structure does not exist yet.

Due to the circumstances described above, the need for new technology is increasing day by day, which is capable of setting up sections in the video content file while keeping the original video content file intact and not occupying a lot of additional memory, inserting additional information for each section, and controlling the video while playing based on the edited content of the video file beforehand.

SUMMARY OF THE INVENTION

The present invention has been devised to solve the problems as described above by providing an apparatus for video contents provision platform and the method thereof, which allow a user to create video contents by editing and producing the video personally with choreography creation application program (or app), to share the contents with numerous users via social network service (SNS) application program so as to get feedback on one's created video contents promptly, and also to efficiently search and purchase one's wanted video content and play.

In addition, the present invention relates to an apparatus for video contents provision platform and the method thereof, which can be implemented in cloud computing server environment for a service provider so as not to construct the servers with additional hardware, and be deployed with SaaS (Software as a Service) implementation to allow users to use only the necessary software they want.

In addition, the present invention relates to an apparatus for video contents provision platform and the method thereof, which provides a video content playback application program having a user interface with slightly different characteristics according to the continuously evolving characteristics of contents so as to allow a user to use the video contents in an optimal environment.

In addition, the present invention relates to an apparatus for video contents provision platform and the method thereof, which provides purchase, independent of OS and device and not requiring ActiveX installation, and enables secure access to the service by providing a hybrid WebAPP environment for mobile WebAPP provision based on HTML 5 so as to allow a user to purchase and use easily contents.

In addition, the present invention relates to an apparatus for editing and playing video contents and the method thereof, which allows making up a data file regarding the editing information of the video content file and not editing the video content file directly, and so as to multifariously play the video content based on the data file containing the editing information of it.

In addition, the present invention relates to an apparatus for editing and playing video contents and the method thereof, which allows inserting cue points (cue-points) in the video on the basis of beats in music or periodic signals equivalent thereto and then dividing the video periodically so as to set up sections in the video using on the above division.

In addition, the present invention relates to an apparatus for editing and playing video contents and the method thereof, in which the sections of the video are divided according to part (PART), verse (VERSE), or action (ACTION) in setting up sections and then the sections are grouped and/or disjointed periodically or non-periodically so as to edit the grouped video contents by features according to a user's convenience.

In addition, the present invention relates to an apparatus for editing and playing video contents and the method thereof, which accesses the above video contents by section in editing and displays simultaneously additional information including the script for explanation of the corresponding section, title of the section, thumbnail, learning difficulty level etc. to the edited section so as to allow a user to access the video by section and to intuitively search fast and play the wanted parts (or sections) of a video.

In accordance with an aspect of the present invention, the apparatus of video provision platform comprises a platform server for providing a video content editing, playback, distribution, or combinations thereof; a database for storing the information on the said video content and the information on video content editing, playback, distribution, or combinations thereof, wherein said platform server comprises a video content creation application program for allowing a user to create or recreate the video content with editing and playback; a video content distribution application program for distributing or delivering the said video content; or an application program including combinations of thereof. In addition, wherein said platform server comprises a user interface; and a service control part consisting of at least one of a user authentication/management part, a charging information provision/processing part, a service control part, and a storage control part, wherein said service control part comprises an app provision/management/support part; and a statistics data processing part, wherein said platform server is implemented in a cloud computing server environment for a service provider so as not to construct the servers with additional hardware and provides application software by a kind of service so as to allow users to choose and use the necessary software they want, wherein said platform server enables purchase, independent of OS and device and not requiring ActiveX installation, by providing a hybrid WebAPP environment for mobile WebAPP provision based on HTML 5 and enabling secure access to the service, wherein said video content creation application program enables creating video contents according to the specifications of the apparatus for video content provision platform with choreography creation utility, and stores and manages created video contents with choreography storage box, wherein said video content distribution application program utilizes social network services and shares video contents with other users through follow function, wherein said video content distribution application program provides hot issue information containing introduction of new choreography and new choreographer and information on events and workshops, and popular video contents chart or popular video produce chart, wherein said statistics data processing part provides a video contents ranking chart for a specific theme based on user opinion information by processing the statistics data using at least one of comment, like, score and recommendation.

In addition, in accordance with another aspect of the present invention, the method of video content provision comprises a phase for registering and authenticating a user in which the video provision platform server supports registering users who want to register for the server; a phase in which wherein said video content provision platform provides users through home page or app store a video content creation application program for creating or recreating a video content with editing and playback; a video content distribution application program for distributing or delivering the said video content; or an application program including combinations of thereof. In addition, wherein said video content provision platform server comprises a phase for storing the said video contents into a database; and also a phase for supporting distribution of video contents with the video content distribution application program, wherein said video content provision platform server is implemented in a cloud computing server environment for a service provider so as not to construct the servers with additional hardware and provides application software by a kind of service so as to allow users to choose and use the necessary software they want, wherein said video content provision platform server provides purchase, independent of OS and device and not requiring ActiveX installation, and enables secure access to the service by providing a hybrid WebAPP environment for mobile WebAPP provision based on HTML 5, wherein said creation application program creates video contents according to the specifications of the apparatus for video content provision platform with choreography creation utility and stores and manages created video contents with choreography storage box, wherein video content distribution application utilizes social network services and shares video contents with other users through follow function, wherein video content distribution application provides hot issue information containing introduction of new choreography and new choreographer and information on events and workshops, and popular video contents chart or popular video produce chart, and wherein said video content provision platform server provides a video contents ranking chart for a specific theme based on user opinion information by processing the statistics data using at least one of comment, like, score and recommendation.

Additionally in accordance with another embodiment of the present invention, the apparatus of editing video contents comprises an input unit for receiving cue-points used for editing the said video contents, section information, section grouping information, additional information, and combinations thereof; an editing unit for generating the video content editing information as a file of additional format while keeping the original video content stream intact; and a storage unit for saving the said editing information in a storage device utilizing an internal storage, an external storage, a virtualized storage in a cloud computing network connected with the network, or combinations thereof. In addition, wherein said editing unit for editing the said video content comprises an editing interpreter unit for interpreting input information with the said input unit; wherein said interpreter unit translates the said editing information received with the said input unit into a property list file, also wherein said cue-points, which are the smallest section unit of the said video content, are inserted in the video on the basis of beats in music or periodic signals equivalent thereto to make key frames, data segments located at spaces between images of the said video, wherein said additional information contains at least one of content producer, a content-specific ID, title of content, content description, appropriate gender, choreography difficulty, play time, genre, thumbnail, or combinations thereof, wherein said section information divides sections progressively according to part, verse, and action in which multiple actions constitutes a verse and multiple verses constitutes an action, wherein said section grouping information is used to group sections by features of the said video content according to a user's convenience.

In addition, in accordance with another embodiment of the present invention, the apparatus of playing video contents comprises a playback interface unit for reading a video content and editing information of the said video content saved as a file of additional format; a playback interpreter unit for translating the editing information read with the said playback interface unit into commands to play the video content; and a playback unit for playing the video content according to the commands by the said playback interpreter unit, and wherein said playback interpreter unit interprets a property list file read by the said playback interface unit as playback commands.

Further, in accordance with another embodiment of the present invention, the method of editing video contents comprises a phase for entering to an input device cue-points used for editing the said video contents, section information, section grouping information, additional information, and combinations thereof; a phase for generating the video content editing information as a file of additional format while keeping the original video content stream intact; and a phase for saving the said editing information in a storage device utilizing an internal storage, an external storage, a virtualized storage in a cloud computing network connected with the network, or combinations thereof. In addition, wherein said editing unit for editing the said video content comprises an editing interpreter unit for interpreting input information with the said input unit; wherein said interpreter unit translates the said editing information received with the said input unit into a property list file, wherein said cue-points, which are the smallest section unit of the said video content, are inserted in the video on the basis of beats in music or periodic signals equivalent thereto to make key frames, data segments located at spaces between images of the said video, wherein said additional information contains at least one of content producer, a content-specific ID, title of content, content description, appropriate gender, choreography difficulty, play time, genre, thumbnail, or combinations thereof, wherein said section information divides sections progressively according to part, verse, and action in which multiple actions constitutes a verse and multiple verses constitutes an action, wherein said section grouping information is used to group sections by features of the said video content according to a user's convenience.

In addition, in accordance with another embodiment of the present invention, the method of playing video contents comprises a phase for reading a video content and editing information of the said video content saved as a file of additional format with a playback interface unit; a phase for translating the editing information read with the said playback interface unit into commands to play the video content with a playback interpreter unit; and a phase for playing the video content according to the commands by the said playback interpreter unit with a playback unit, and wherein said playback interpreter unit interprets a property list file read by the said playback interface unit as playback commands.

The present invention relates to an apparatus of provisioning, editing, and playing video contents and the method thereof, which allows a user to create video contents by editing and producing the video personally with a choreography creation application program and to share the contents with numerous users via social network service application program so as to get feedback on one's created video contents promptly and also to efficiently search and purchase one's wanted video content and play; further the said platform is implemented in cloud computing server environment for a service provider so as not to construct the servers with additional hardware, and the application software is provided as a kind of service so as to allow users to choose and use the necessary software they want; further it allows a user to use the video contents in an optimal environment by providing a video content playback application program that has a user interface with slightly different characteristics according to the continuously evolving characteristics of contents; and further it provides purchase, independent of OS and device and not requiring ActiveX installation, and enables secure access to the service by providing a hybrid WebAPP environment for mobile WebAPP provision based on HTML 5 so as to allow a user to purchase and use easily contents. In addition, the present invention can edit and play video contents by making up a data file regarding the editing information of the video content file and not editing the video content file directly so as to multifariously play the video content based on the data file containing the editing information of it, further insert cue points (cue-points) in the video on the basis of beats in music or periodic signals equivalent thereto and then divide the video periodically so as to set up sections in the video using on the above division, further edit and play video contents and the method thereof, in which the sections of the video are divided according to part (PART), verse (VERSE), or action (ACTION) in setting up sections and then the sections are grouped and/or disjointed periodically or non-periodically so as to edit the grouped video contents by features according to a user's convenience, and further access the above video contents by section in editing and display simultaneously additional information including the script for explanation of the corresponding section, title of the section, thumbnail, learning difficulty level etc. to the edited section so as to allow a user to access the video by section and to intuitively search fast and play the wanted parts (or sections) of a video.

DETAILED DESCRIPTION OF THE PREFERRED EMBODIMENTS

Hereinafter, an embodiment of the apparatus of provision, editing, and playing video contents and the method thereof in accordance with the present invention will be described with reference to the accompanying figures.

Figure 1:
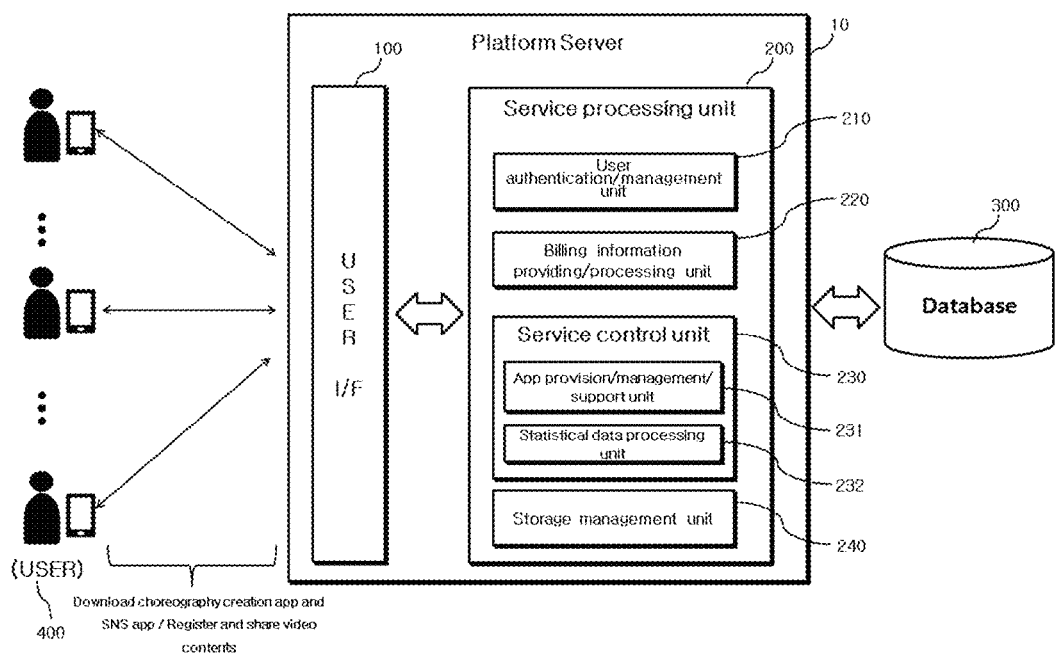
FIG. 1 is an exemplary diagram for explaining the structure of an apparatus for video contents provision platform in accordance with an embodiment of the present invention.

FIG. 1 is an exemplary diagram for explaining the structure of an apparatus for video contents provision platform in accordance with an embodiment of the present invention.

As shown in FIG. 1, the said apparatus for video contents provision platform allows a user to download a choreography creation application program (App) and SNS (Social Network Service) application program to one's personal smart devices and to create and distribute video contents with the said application programs. The structure of the said apparatus for video contents provision platform comprises a platform server (10) including a user interface (I/F) (100) and a service processing part (200) and a database (300).

The said user interface (100) provides an Internet homepage to download application programs required for using the platform of the present invention or related interfaces for a user (400) to use the functions of the platform of the present invention with SNS application programs.

In addition, the said service processing unit (200) is used for integrated processing of the services provided by the present invention and comprises including a user authentication/management part (210), a charging information provision/processing part (220), a service control part (230), and a storage management part (240). The said user authentication/management part (210) forces users to take certification of their identity and manages personal information and a list of the certified users in order to offer a reliable service to the users when using a paid service that the present invention provides. Additionally the charging information provision/processing part (220) provides relation information and processes payment when the users may purchase or sell paid contents on the platform the present invention provides.

In addition, the said service control part (230) provides application programs (Apps) and new versions of application programs, a content list, price, genre, and statistics data for user feedback information, comprising app provision/management/support part (231) and statistics data processing part (232), and also provides related services in connection with the user authentication/management part (210), the charging information provision/processing part (220), and the storage management part (240).

In addition the statistics data processing unit (232) of the service control part (230) provides a video contents ranking chart for a specific theme such as popular video contents or popular choreographers by collecting user opinion such as comment, like, score and recommendation etc. and extracting the statistical data.

In addition, the said storage management part (240), connected with the said database (300), stores and manages data including the video content registered to the platform of the present invention and user information, statistical data, application programs, etc.

In addition, the database (300) is typically a local storage unit, an internal memory or an external memory, storing data related with the service of the present invention; but in the present invention, it include further a virtualized storage in a cloud computing network (in short, cloud storage). For example, the said cloud storage further includes private cloud storage that the service provider offers or free cloud storage (or network HDD) that portal sites (e.g. Naver, Daum, etc.) offer. That is the above database (300) is a database connected to the platform server (10) via electric or optic cable, a network including cloud computing, or combinations thereof.

Further the said apparatus for video contents provision platform of the present invention including the said platform server (10) in addition to the above database can be implemented in cloud computing server environment for a service provider so as not to construct the servers with additional hardware, and provide the application software (App) as a service (e.g. SaaS [Software as a Service]) implementation to allow users to use only the necessary software they want.

In addition, the present invention provides purchase, independent of OS and device and not requiring ActiveX installation, and enables secure access to the service by providing a hybrid WebAPP environment for mobile WebAPP provision based on HTML 5 so as to allow a user to purchase and use easily contents.

For reference, each configuration means for comprising the apparatus for video contents provision platform in the above embodiment of the present invention is described only for the convenience of explanation; in fact all of the operations may be processed in any of the configuration and the means may be broke down to more diversified means or be provided with combinations of the configuration means.

In addition, the said choreography creation application program and SNS application program may be independent applications each other or an integrated application. However, the separate application programs are assumed in the present invention only for the convenience of explanation.

Figure 2:
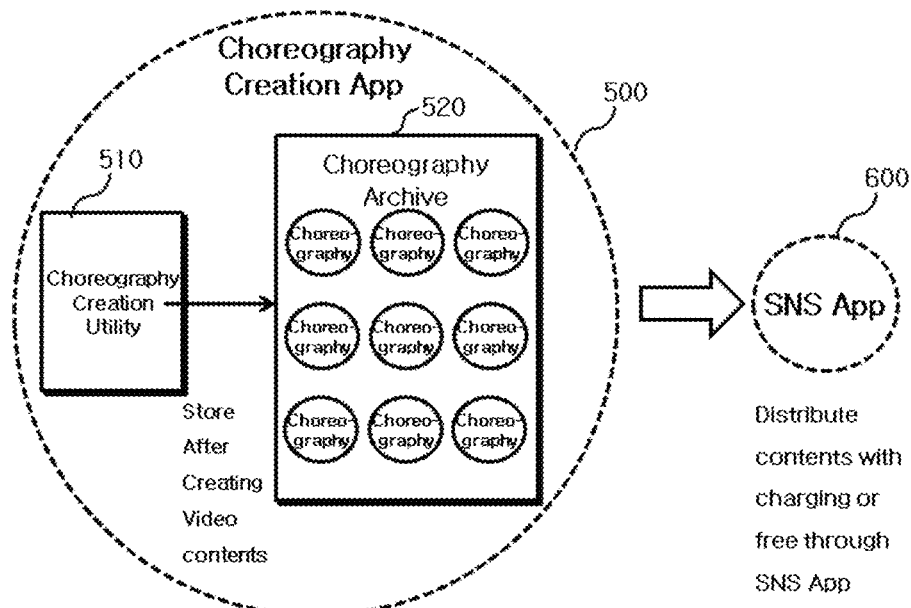
FIG. 2 is an exemplary diagram for explaining a choreography creation application program provided by the apparatus for video contents provision platform in accordance with an embodiment of the present invention.

FIG. 2 is an exemplary diagram for explaining a choreography creation application program provided by the apparatus for video contents provision platform in accordance with an embodiment of the present invention.

As shown in FIG. 2, the apparatus for video contents provision platform provides a choreography creation application program (App) (500) producing video contents according to the specifications of the said service to users. The said choreography creation application program (500) can be downloaded by subscribing the apparatus for video contents provision platform through the internet or from app store; the said choreography creation application program (500) allows a user to record one's motion using a choreography creation utility (510) while checking in real-time and contains various editing functions according to the types and characteristics of the video contents, and the users who consume the video contents. The video content editing functions supported by the said choreography creation utility (510) includes inserting cue-points and dividing the video contents into sections according to the content of the video, setting up different playback speed for each grouped section, setting up playback delay time for a user to easily repeat the video content, and playing repeatedly specific motion of difficulty.

In addition, the said choreography creation application program produces users' video contents as described above, and stores them in the choreography storage box (520) and shares them with other users with SNS application programs (App) (600). In this case, the choreography producers may share freely their contents with other user or distribute them as paid contents using the said SNS application programs.

Figure 3:
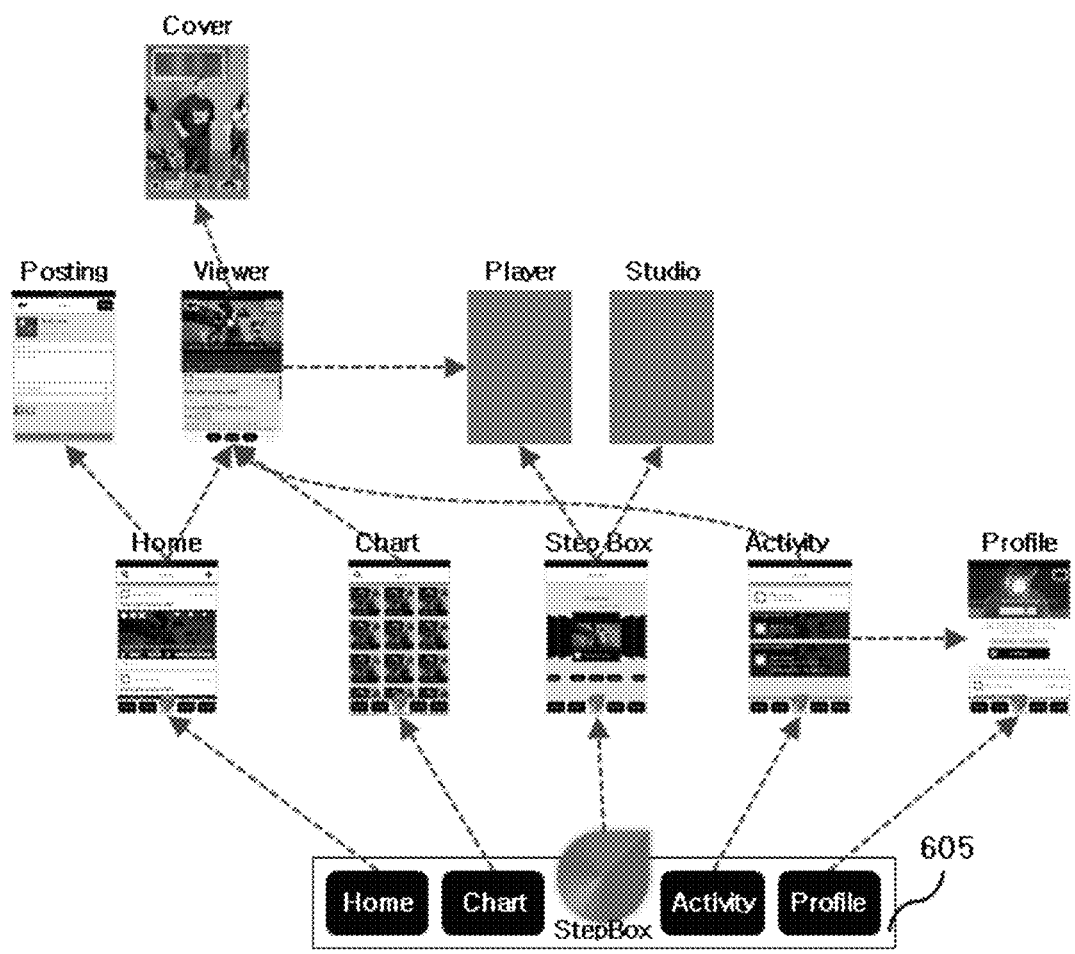
FIG. 3 is an exemplary diagram for explaining a SNS application program in accordance with an embodiment of the present invention.

FIG. 3 is an exemplary diagram for explaining a SNS application program in accordance with an embodiment of the present invention.

As shown in FIG. 3, the basic interface of the SNS application program contains home (Home) button, chart (Chart) button, activity (Activity) button, profile (Profile) button and choreography creation application program button (StepBox button). The button part (605) of the said interface can be displayed or hidden with dragging the screen.

Here the choreography creation application program button can connect to the choreography creation application program installed in the SNS application program; or a separate application program in which the said choreography creation application program is driven with interacting with the SNS application program.

The said home button is connected to the said my home interface and the user can post text contents, image contents, and video contents into the my home interface; write additional information (title, profile of post writer, date and time, number of user opinions including replies, choreographer and performer list) related to the post; and shares the contents in other SNS (Twitter, Facebook, and etc.) In addition, the said my home page provides a viewer (Viewer) interface that plays contents uploaded by the user or other users. The said viewer interface includes functions displaying additional information for the contents or statistical information on user opinions such as like, score and recommendation according to the playback sections of the contents represented by the real-time graph (Seekbar); and by selecting a specific section of the said real-time graph the user can write his own opinion on that section.

In addition, the viewer interface provides users with a function to make a cover video for the video contents. The cover video making method is first to select a video content, to activate recording mode, and to set up the start and end points of a section in the video content to record. Then the recording is started, and the recording mode is completed as the user records all of the selected sections and the interface in which the user can write additional information to post the cover video is opened. At this time the additional information of the cover video includes automatically the choreography of the original video; it is reasonable not to make this function mandatory.

In addition, the above chart button is connected to chart (Chart) interface, emerging (Emerging) interface, and choreographers (Choreographers) interface. The said chart interface is an interface providing a video contents ranking according to specific criteria; the said emerging interface provides new video contents; the said choreographers interface provides a ranking list of choreographers (or video contents producers). The user can receive video contents he wants with the choreographers interface. The detailed information on this interface is described with reference to FIG. 7.

Figure 4:
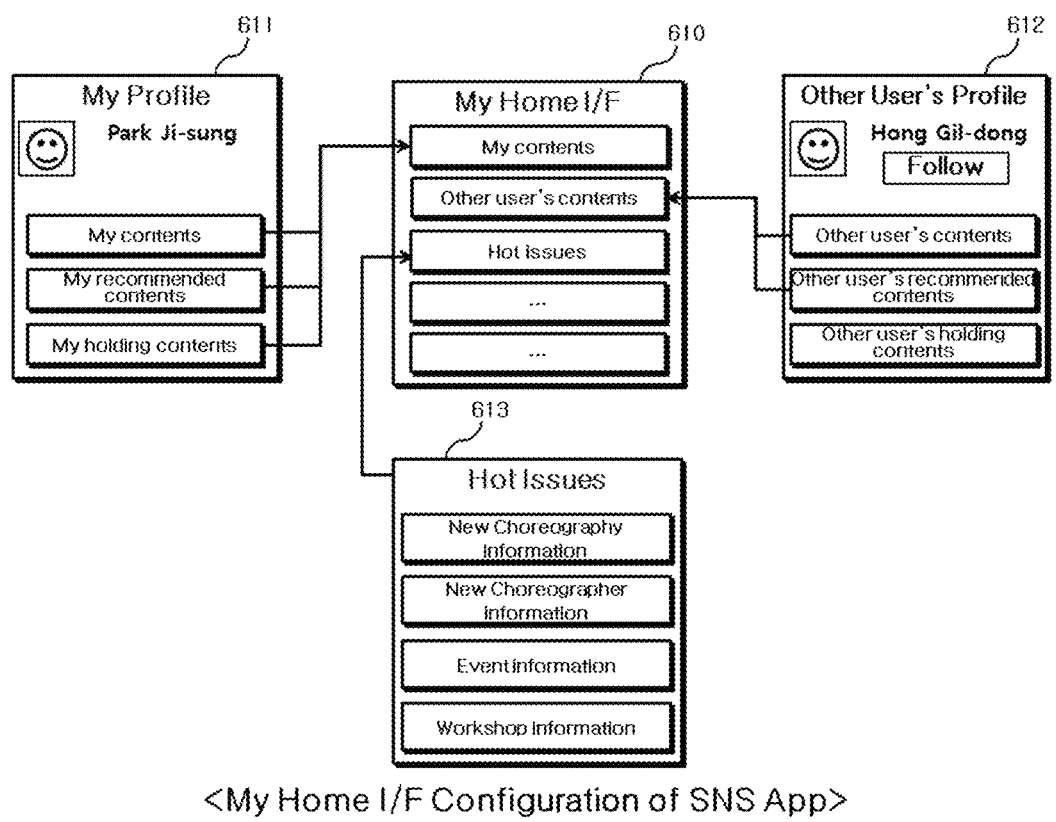
FIG. 4 is an exemplary diagram for explaining the structure of my home interface in the SNS application program provided by the apparatus for video contents provision platform in accordance with an embodiment of the present invention.

FIG. 4 is an exemplary diagram for explaining the structure of my home interface in the SNS application program provided by the apparatus for video contents provision platform in accordance with an embodiment of the present invention.

As shown in FIG. 4, the users share with other users various contents (text, text+picture, choreographic video, general video, and etc.) including produced video contents made with the said choreography creation application program via the SNS application program. The said SNS application program (600) allows other users to view my profile (611) through the follow (Follow) function, to view other user's profile (612) vice versa, and this information about my profile can be displayed in the menu of my home (My Home) interface (I/F) (610). The said my home interface comprises my content menu, other user's content menu, hot issue menu, and etc. The said my content menu includes the contents produced by the user, other user's contents recommended by the user, and the saved contents to view later and the said other user's content menu contains the contents produced by other users and the recommended contents by other users. That is, the user confirms one's own contents and other user's contents followed by the user. Since the saved contents among the above contents are saved only for viewing later and the user does not intend to disclose, it is therefore reasonable not to provide the information on the saved contents to other users.

In addition, the said my home interface can display hot issue (Hot Issue) information (613), the said hot issue information provisioned by the service provider contains the introduction of new choreography and new choreographer and the information on events and workshops to update information whenever needed.

Figure 5:
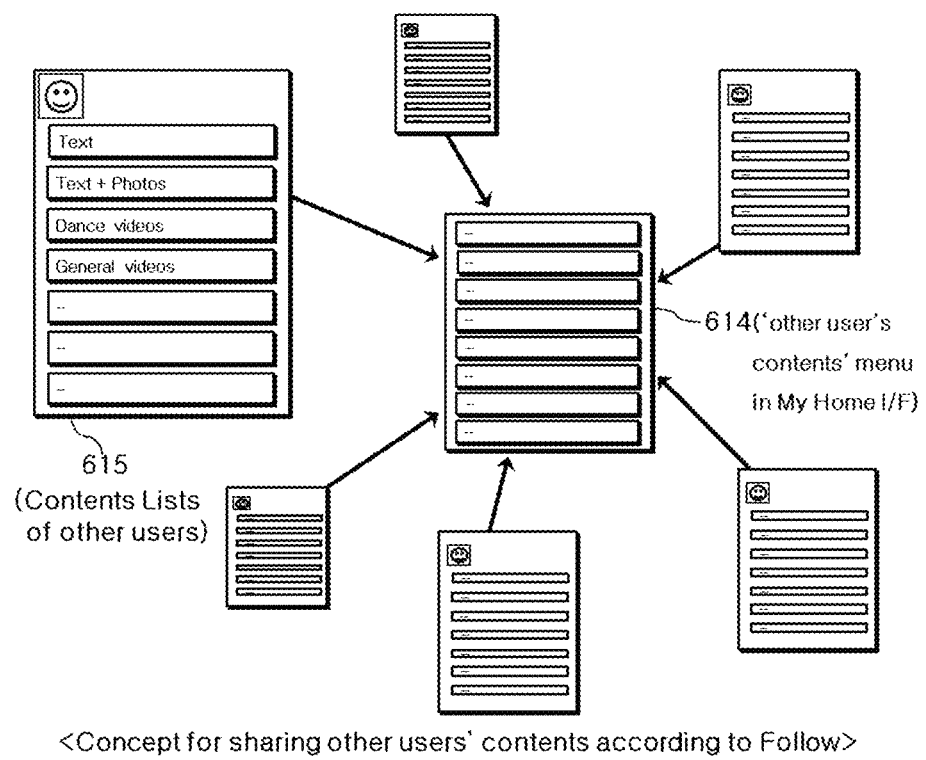
FIG. 5 is an exemplary diagram for explaining a concept sharing the contents of other users in the SNS application program in accordance with an embodiment of the present invention.

FIG. 5 is an exemplary diagram for explaining a concept sharing the contents of other users in the SNS application program in accordance with an embodiment of the present invention.

As shown in FIG. 5, the SNS application program shares other user's contents by the follow function. When entering other user's contents menu (614) in the said my home interface (610), the list of other user's contents is opened. The content of the said other user's contents list contains text, text+photos(pictures), dance videos, general videos, and etc. Because of the above structure, the user can receive as many contents as the number of follows. Due to the characteristics of SNS structure, if a user opens publicly other users following the user, other users following the user can receive the same information as the user receives, and they can contract one another as new follows. As described above, the platform for providing video contents according to the present invention enables users to expand the network to be able to share video contents through follow function.

On the other hand, the follow method can be unilateral in that one can follow the other user without acquiring the other's consent or mutual in that the other can decide to allow follow or not if one sends a request to follow the other and one can follow the other only if the other allows. In case of the unilateral method, it is required to provide a follow lock function and a follow ban function to prohibit the follow of a specific user in order to keep a user's privacy and security. Additionally the mutual follow function may permit to follow each other if one sends a follow request and the other accepts the request; or it may allow the other user to follow but one does not follow the other by setting.

Figure 6:
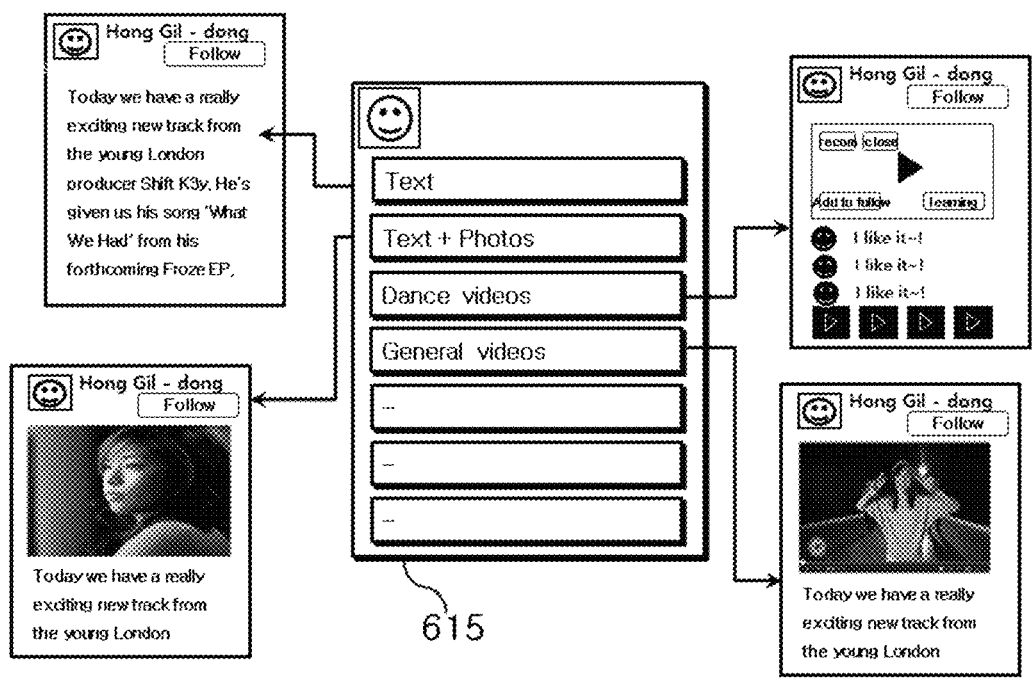
FIG. 6 is an exemplary diagram for explaining types of contents supported by the list of other users in the SNS application program in accordance with an embodiment of the present invention.

FIG. 6 is an exemplary diagram for explaining types of contents supported by the list of other users in the SNS application program in accordance with an embodiment of the present invention.

As shown in FIG. 6, the said other user's contents list comprises contents including text, text+picture, choreographic video, general video, and etc. and the said SNS application program (600) provides various content utility function according to the types of the said contents. For example, during a dance video content playback, the SNS application program of the present invention plays the said dance video while learning effectively by setting up playback speed, playback delay time, and repeated playback of section with a learning function. Likewise the SNS application program (600) provides an optimal interface in utilizing various kinds of contents and also the apparatus for video contents provision platform provides constantly upgraded versions of the SNS application program to users as the contents are developed further.

Figure 7:
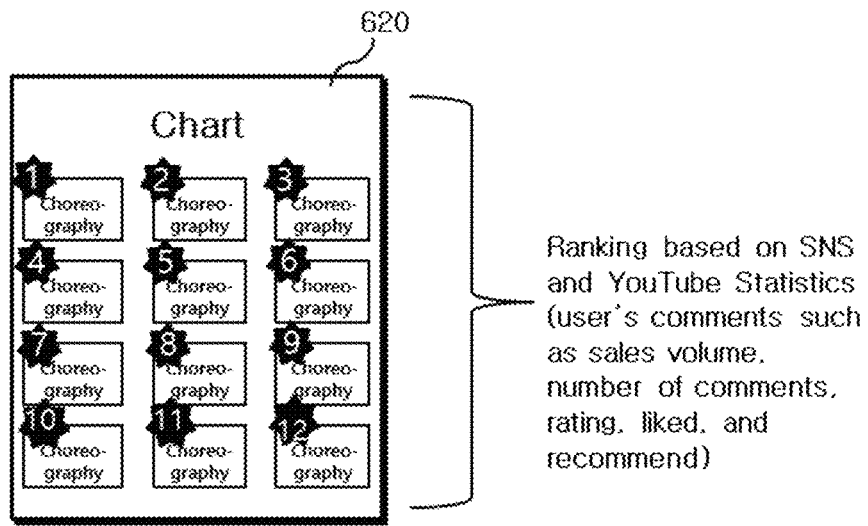
FIG. 7 is an exemplary diagram for explaining the interfaces for chart and choreography creation application program of the SNS application program by the apparatus for video contents provision platform in accordance with an embodiment of the present invention.
Figure 7:
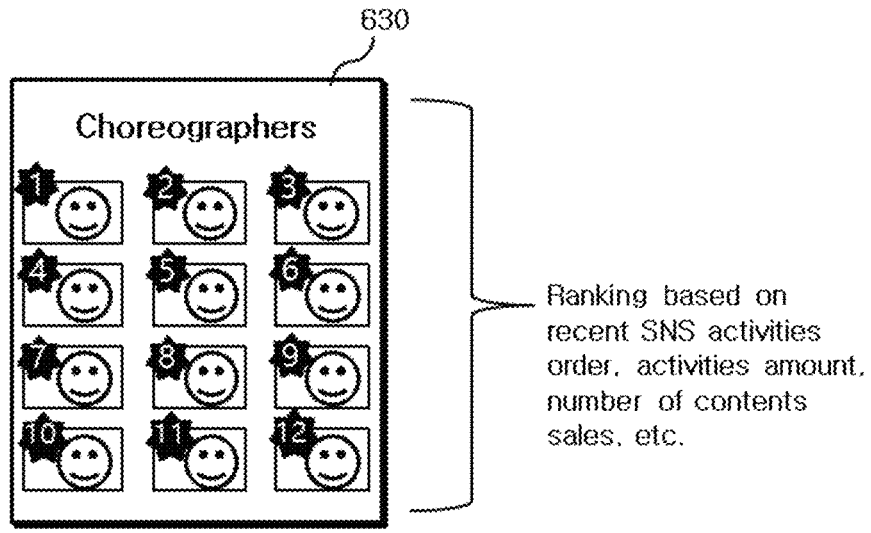

FIG. 7 is an exemplary diagram for explaining the interfaces for chart and choreography creation application program of the SNS application program by the apparatus for video contents provision platform in accordance with an embodiment of the present invention.

As shown in FIG. 7, the SNS application program provides a chart (Chart) interface (620) and choreographers (Choreographers) interface (630), the said chart interface (620) allows users to easily confirm popular video contents by providing a video contents ranking chart based on the SNS statistics (sales volume, number of replies, user opinion such as like, score and recommendation) and YouTube statistics (number of replies, and user opinion such as like, score and recommendation). The video contents created by the present invention can be published to YouTube and video contents in YouTube can be used for video content creation with the present invention, vice versa. In this case, the statistics for the video contents created by YouTube may be gathered from YouTube. In addition to the popular video contents ranking chart, contents charts for various themes can be made based on the statistical data for various criteria.

In addition, the said choreographers interface (630) informs users of contents producers such as choreographers and provides a ranking chart for contents producers based on order and volume of SNS activities, and sales volume of contents and etc. Like the video contents ranking chart, the contents producers ranking chart can also be provided to users.

By providing users with the chart interface (620) and the choreographers interface (630), the SNS application program give power users (e.g. choreographers, contents producers, and etc.) a motivation to create well-made various contents including video contents and ordinary users new and easy way of finding high-quality contents, and goal to achieve or object to desire.

Figure 8:
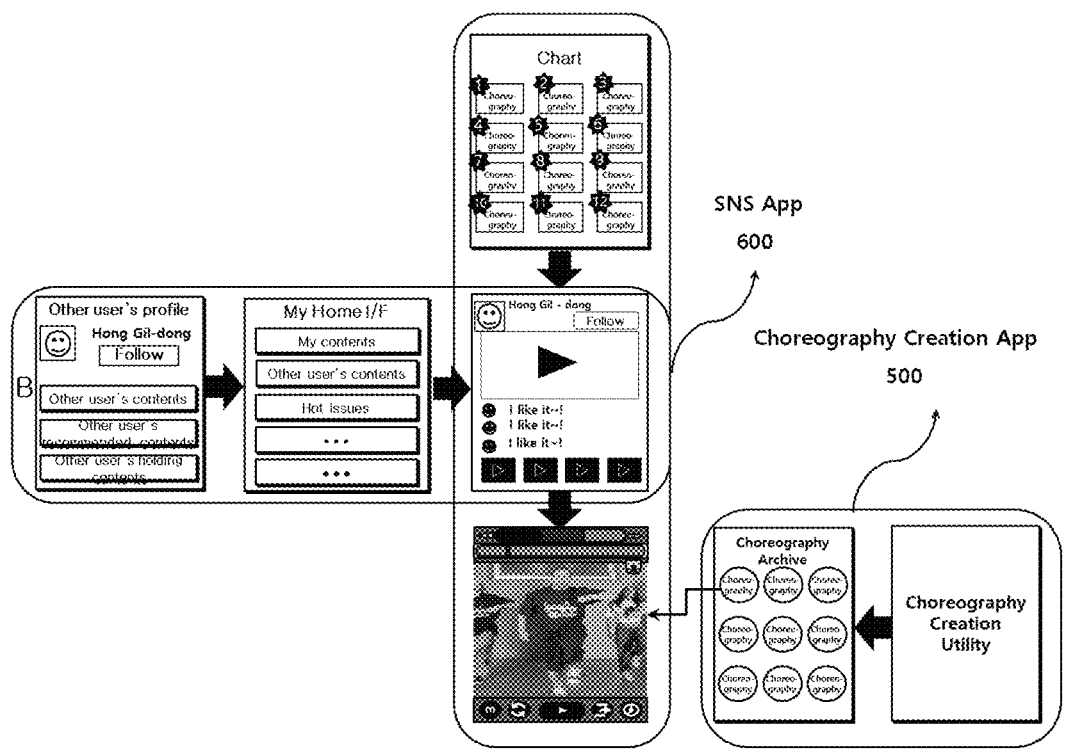
FIG. 8 is an exemplary diagram for explaining the service structure of the apparatus for video contents provision platform in accordance with an embodiment of the present invention.

FIG. 8 is an exemplary diagram for explaining the service structure of the apparatus for video contents provision platform in accordance with an embodiment of the present invention.

As shown in FIG. 8, video contents creation and distribution services in the apparatus for video contents provision platform are provided with the choreography creation application program (500) and the SNS application program (600) together; the video contents distributed by the service in the present invention are fitted to the specifications of the service by producing and editing with the choreography creation utility in the choreography creation application program; the video contents are stored in the choreography storage box and then provided to other users with the SNS application program.

There are two methods to provide the video contents produced using the choreography creation application program (500) by the SNS application program (600). One method is shown in FIG. 7A in which the service provider of the present invention extracts statistical data by collecting user opinion such as comment, like, score and recommendation etc. and uses charts provided to users (e.g. the video contents ranking list for a specific criterion or the choreographers ranking list for a specific criterion) based on the said statistical data; the other method is shown in FIG. 7B in which a user uses a follow function to connect with other users and receives other user's contents or recommended contents using the said Follow system. The video contents, provided with this service system, can be free or paid contents and the indication of free and paid may be represented by the color of contents icons or be classified and displayed with different categories; additionally in case of paid contents, it is required to provide preview of paid video contents for users to purchase paid video contents reliably. The setup for free or paid can be made multifariously by users and be changed while in service according to the circumstances.

Figure 9:
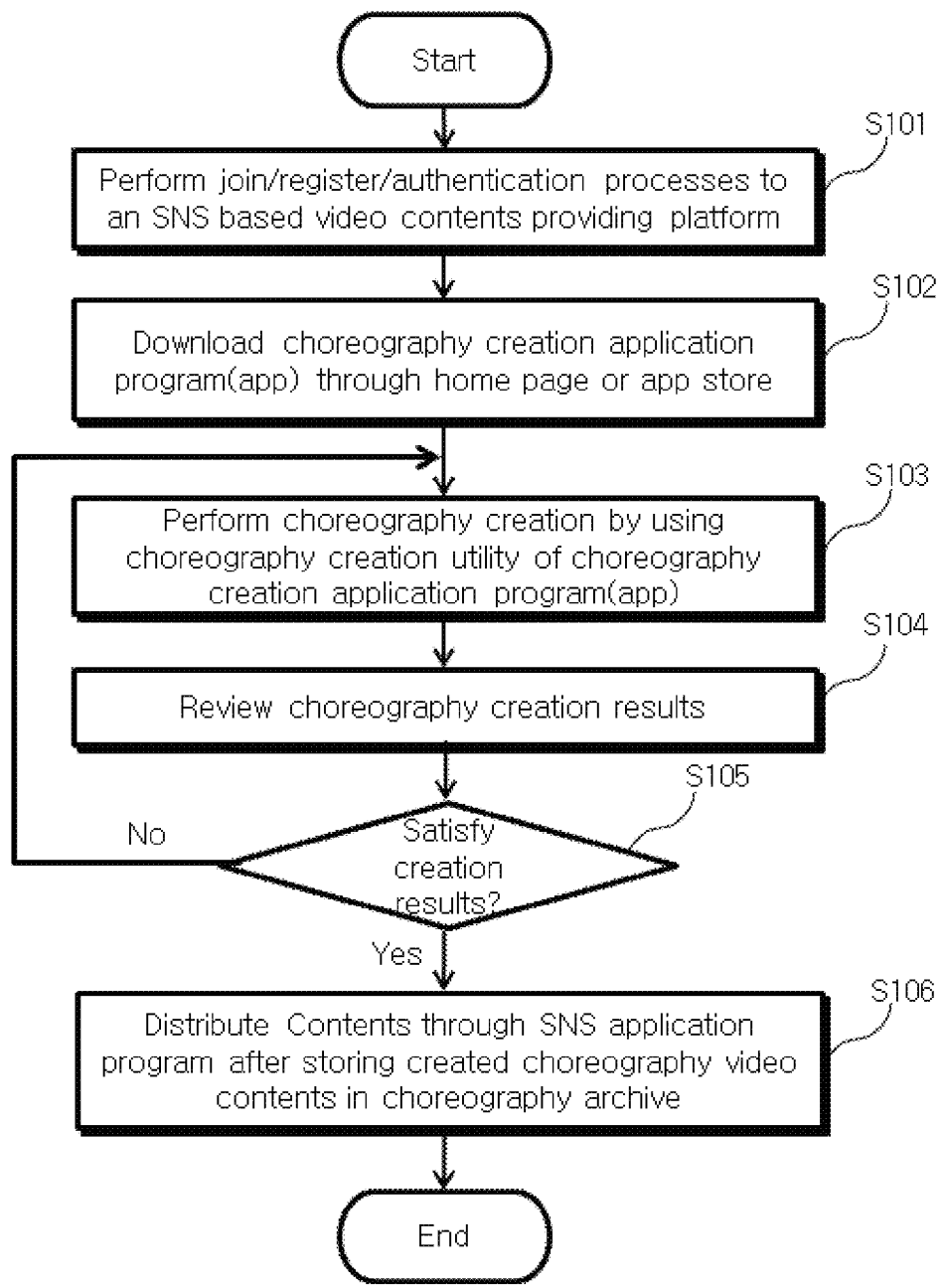
FIG. 9 is a flow chart for explaining the service process of a choreography creation application program provided by the apparatus for video contents provision platform in accordance with an embodiment of the present invention.

FIG. 9 is a flow chart for explaining the service process of a choreography creation application program provided by the apparatus for video contents provision platform in accordance with an embodiment of the present invention.

As shown in FIG. 9, after a user subscribes to the apparatus for video contents provision platform in the present invention via the internet and completes the user registration and authentication process (S101), the user downloads the choreography creation application program (App) from homepage or app store (S102). Then the user who downloaded the said choreography creation application program performs producing choreography with the choreography creation utility (S103), and reviews the created choreography by playing it (S104). If the review result is not satisfactory, the user can use the choreography creation utility again to perform creating or recreating the choreography in order to get satisfactory results (S105) and if the review result is satisfactory, the user saves the created choreography into the choreography storage box and can distribute it with the SNS application program (S106).

Figure 10:
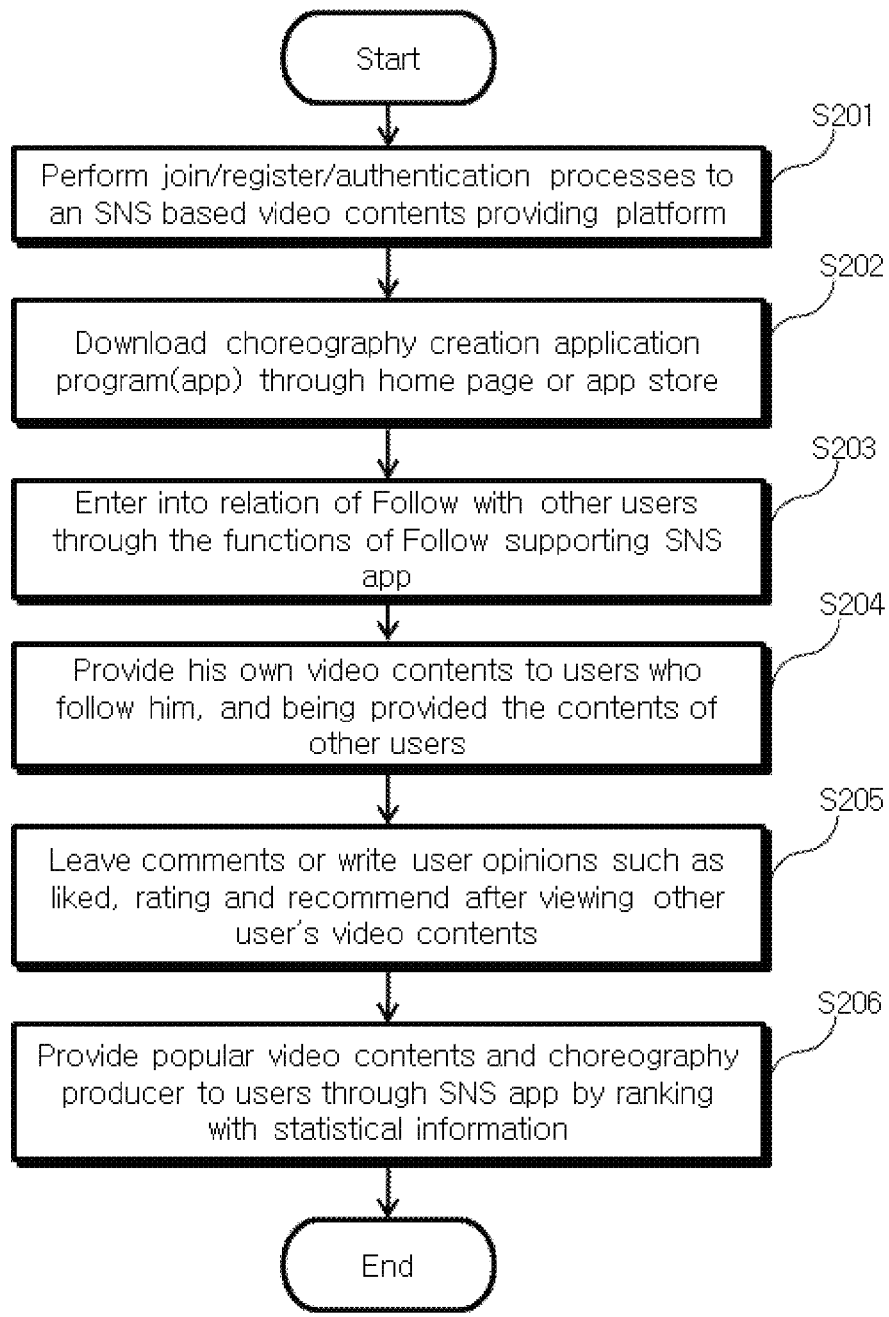
FIG. 10 is a flow chart for explaining the service process of a SNS application program provided by the apparatus for video contents provision platform in accordance with an embodiment of the present invention.

FIG. 10 is a flow chart for explaining the service process of a SNS application program provided by the apparatus for video contents provision platform in accordance with an embodiment of the present invention.

As shown in FIG. 10, after a user subscribes to the apparatus for video contents provision platform in the present invention via the internet and completes the user registration and authentication process (S201), the user can download the choreography creation application program (App) from homepage or app store (S202). Then the user uses the follow function to connect with other users (S203) and the user provides his registered video contents to other following users or receives other user's video contents (S204). The user may watch paid video contents or video contents shared by the connected users with the follow function and write replies or user opinions such as like, score, recommendation, and etc. The user opinions gathered in this way are statistically processed according to specific criteria and the ranking charts for specific themes on video contents and choreography producers are provided to users with the SNS application program (S206). This system gives choreographers a motivation to create well-made contents and ordinary users new and easy way of finding high-quality contents, and goal to achieve or object to desire.

Figure 11:
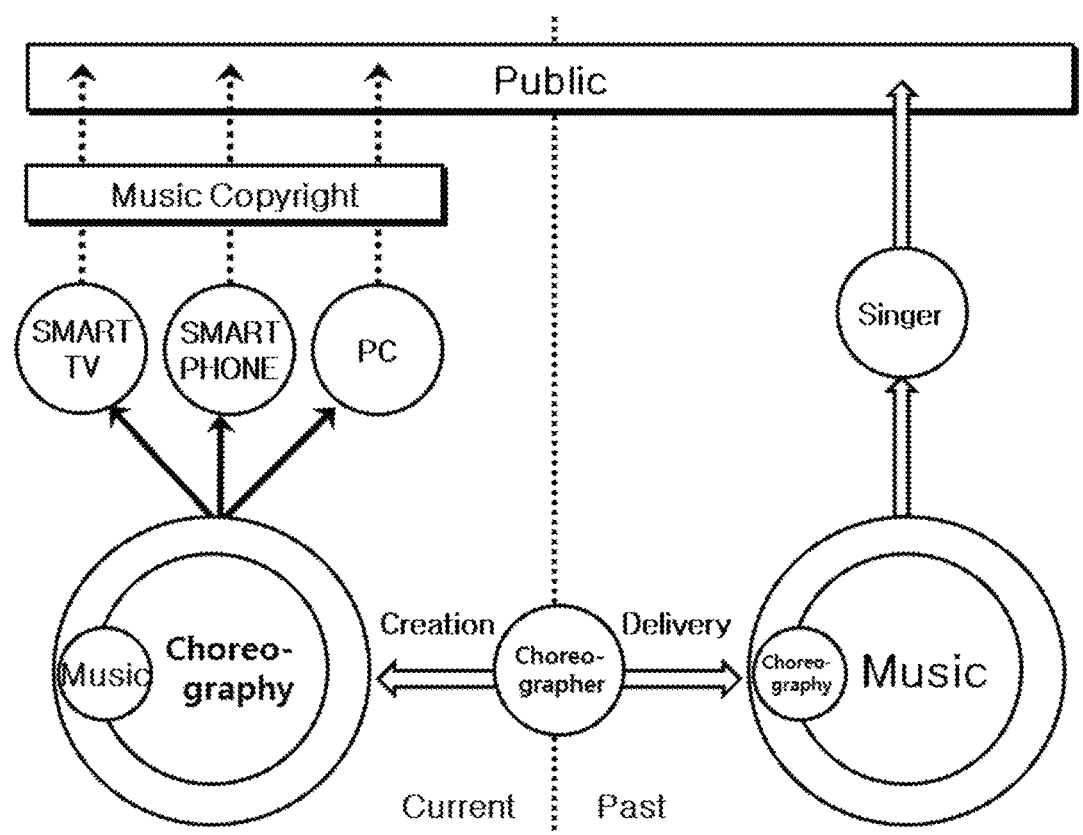
FIG. 11 is an exemplary diagram for explaining the change of people's conception on choreography and the resulting choreography contents development according to the change.

FIG. 11 is an exemplary diagram for explaining the change of people's conception on choreography and the resulting choreography contents development according to the change.

As shown in FIG. 11, it is widely accepted in society that the choreography including yoga motion, exercise motion, and dance motion, has its own merchantability independently of music, not a subordinate element to music. Though the choreography using copyright-free music can be an independent product to sell and one can earn profit from selling the choreography, any organized system in which choreographers can produce and distribute the choreography efficiently does not yet exist. Thus, the present invention provides a platform in which the digital making is used in the choreography production rather than the conventional method to make the choreography in type of video contents and the choreography is provided to the users efficiently with SNS.

Hereinafter, an embodiment of the apparatus for editing and playing video contents and the method thereof in accordance with the present invention will be described in detail.

Figure 12:
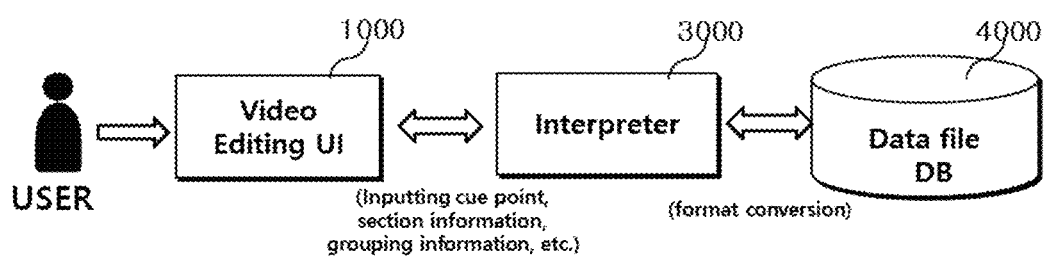
FIG. 12 is an exemplary diagram for explaining an apparatus for editing and reproducing video content in accordance with an embodiment of the present invention.
Figure 12:
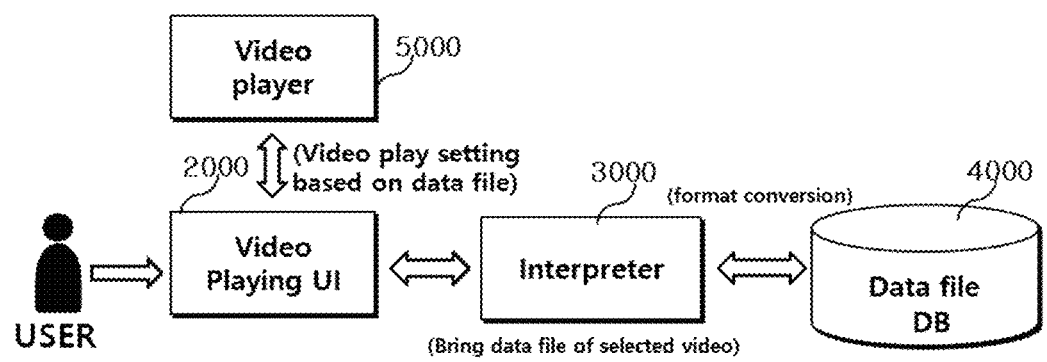

FIG. 12 is an exemplary diagram for explaining an apparatus for editing and reproducing video content in accordance with an embodiment of the present invention.

As shown in FIG. 12 (a), the method of video contents editing in the present invention is as follows: the user enters the editing information related with the video contents (cue-point, section information, grouping information, additional information, and etc.) with the video contents editing UI (User Interface) (1000); generate a data file in transformed format by the interpreter (3000); and saves the said data file in the data file DB (4000).

More specifically, the user performs reading of the original video contents with the said video contents editing UI (1000) and makes up the editing content such as cue-point insertion, section information, grouping information, additional information insertion, and etc. according to one's convenience. The said editing content is not included in the original video contents file but is transformed into a data file format with the said interpreter (3000), and the data file made by the said method is stored in the data file DB (4000) while the original video contents file remains intact as it is. In addition, the said data file DB is a database utilizing an internal storage, an external storage, a virtualized storage in a cloud computing network connected with the network, or combinations thereof.

As described above, the method of video contents editing in the present invention is specifically not to edit and reconfigure the composition of the original video contents but to generate a data file containing cue-point, section information, and grouping information related to the content of the said video contents. The data file generated by this method can be used to play the said video contents section by section according to the user's convenience as if the video contents are directly edited. In fact, the video contents playback UI (2000) plays the corresponding part of the video content file for each section with the data file and the video content file is not divided according to sections of the video contents.

The above cue-point is to for a user to create key frames as a data segment between the video images to the closest point in time that a user specified and the inserted cue-point is the smallest unit of editing. The cue-points can be inserted based on beats in music or equivalent periodic signals thereto and the insertion method using BPM (Beats per Minute) is illustrated in the present invention.

The section information and the grouping information contain information on section and information on grouping of sections, respectively, according to the content of video contents; thus the original video contents can be played based on section and grouping information.

The additional information contains content producer, a content-specific ID, title of content, content description (script), appropriate gender, choreography difficulty, play time, genre, thumbnail, and etc.; the user identify effectively a video content when playing the video content with the said data file.

In addition, as shown in FIG. 12 (b), the method of video contents playback in the present invention is as follows: the user selects a video content to play with the video contents playback UI (20); the data file for the selected video content is loaded from the said data file DB (4000) and executed by the interpreter (3000). The video player (5000) plays the original video contents read from the video contents DB and controls the playback of the video content based on the said editing information in the said data file. In other words, the user can open the data file for a video content to play with the said video contents playback UI (2000) and control the playback of the original video contents by interacting with the video player (5000) based on the data file.

On the other hand, the video contents data file in the present invention comprises a type of property list (Property List: plist). The said property list file is a file that records necessary information to execute an application program (or app); all apps have a property list and the extension name, plist, and the property list is called usually as plist. Typically the said property list file is used to save the user's setting but in the present invention it is used to generate the data file for video contents. In addition, the property list in the present invention uses XML document format, and the XML tag and the data saving format used in the XML property list file of the present invention is shown in Table 1.

TABLE 1

| XML Tag | Type |
| --- | --- |
| <string> | UTF-8 encoding character string |
| <real>, <integer> | Decimal character string |
| <true /> or <false /> | Two kinds of tags |
| <date> | ISO 8601 type character string |
| <data> | Base64 encoding data |
| <array> | Child element number |
| <dict> | <key> tag and plist element related tag |

As shown in the above [Table 1], the XML tags used in the XML property list file of the present invention includes <string>, <real>, <integer>, <true/> or <false/>, <data>, <date>, <array>, <dict>, and the data saving format for each tag uses UTF-8 character string, decimal number string, two types of tags, ISO 8601 character string, Base64 encoding data, child element number, <key> tag, and tag related with plist element according to the order described above.

Figure 13:
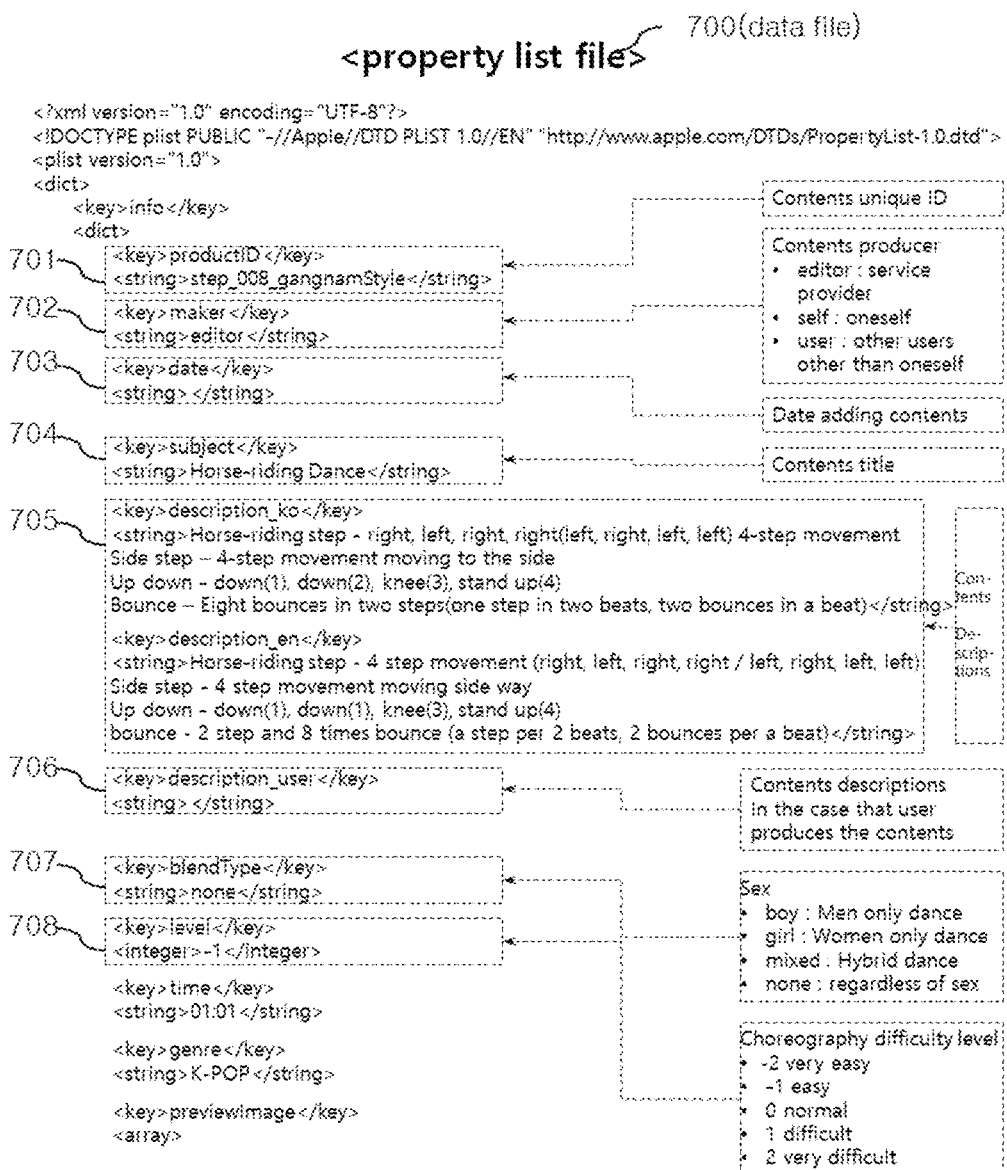
FIG. 13 to FIG. 15 are exemplary diagram for explaining a video content file in accordance with an embodiment of the present invention.
Figure 14:
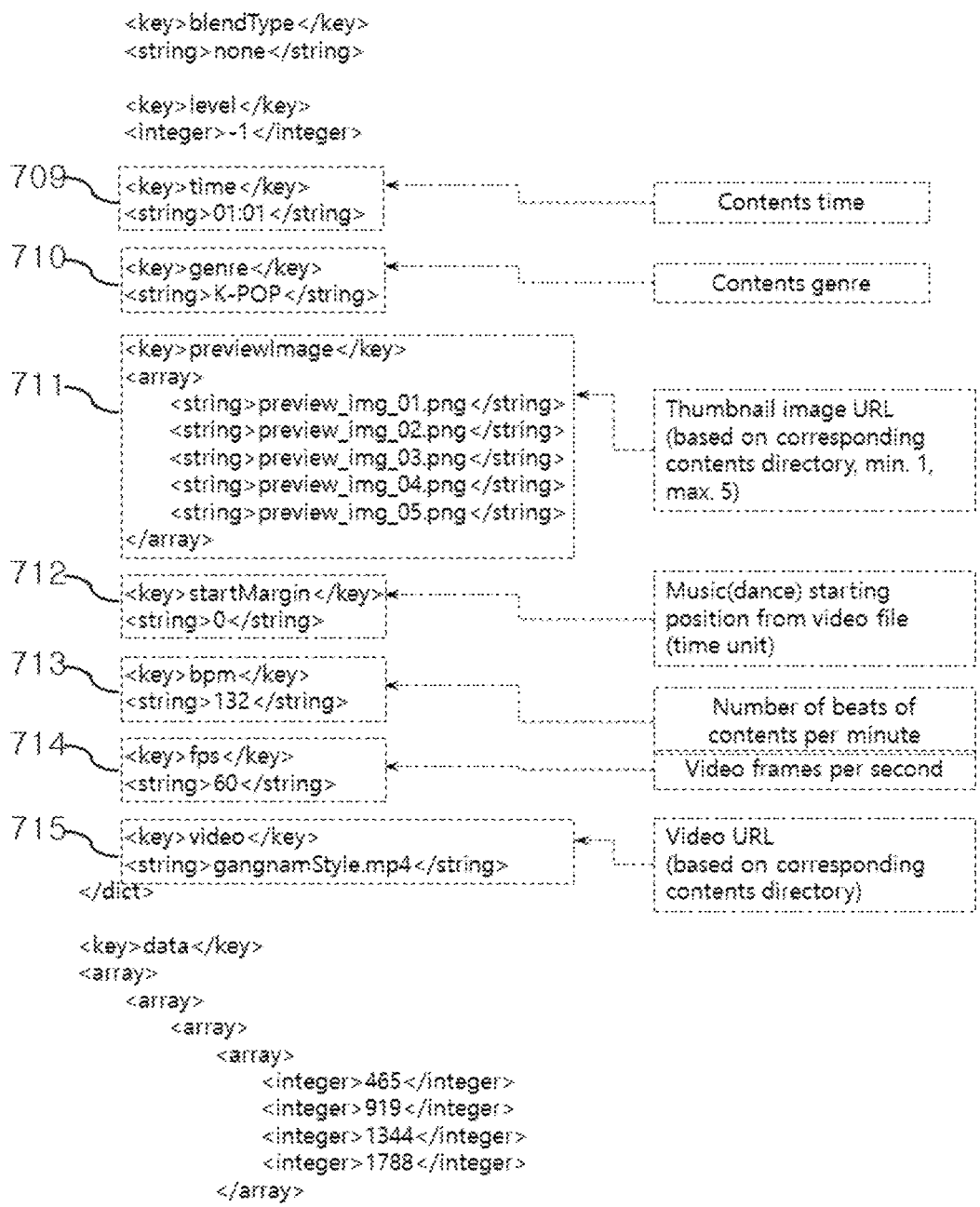
Figure 15:
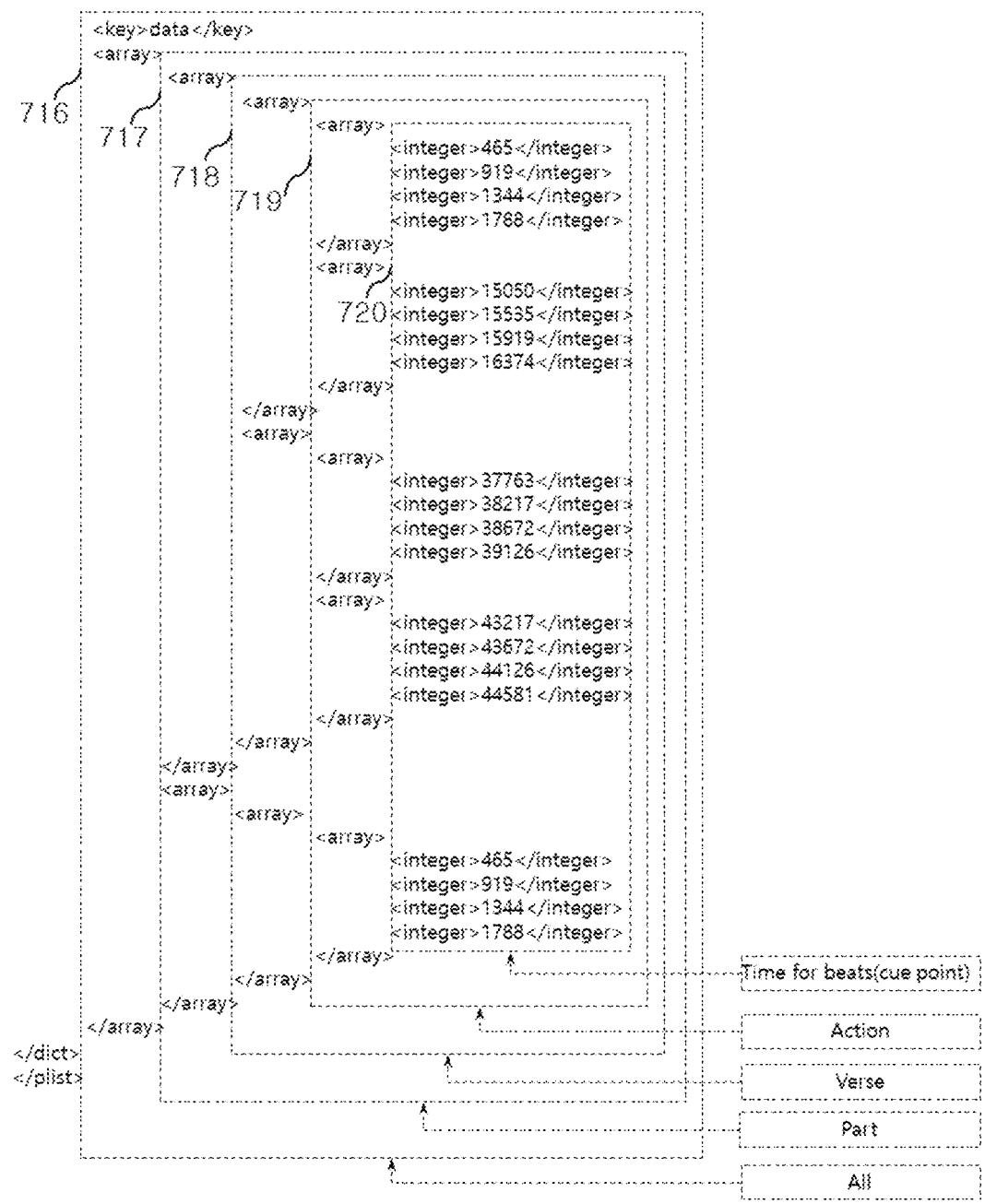

FIG. 13 to FIG. 15 are exemplary diagram for explaining a video content file in accordance with an embodiment of the present invention.

As shown in FIG. 13, FIG. 14, and FIG. 15, the video contents data file in the present invention comprises a type of property list file (700) and the first column of the said property list file (700) contains XML version, used character sets, property list format and version information; and the editing information of the said video contents are included next. The editing information of the said video contents includes time information of music based on beat, section information based on beat, section script, BPM (Beat per Minute), title, description, additional information, and etc.

For reference, in an embodiment of the present invention, the property list file (700) uses Apple DTD (Document Type Definition). The said property list file using Apple DTD has a pair of <key> and <string> in each line and the value defined in <key> is given by the format defined in <string>.

Hereinafter, the structure of the property list file (700) will be described sequentially according to the order illustrated in FIG. 13, FIG. 14, and FIG. 15.

As shown in FIG. 13, <key> productID </key> value (701) is a content-specific ID and can be an identification ID (e.g. step_008_gangnamStyle) added to the edited video contents.

<key> maker </key> value (702) represents the content producer, the types of content producers include editor (service provider (prompt)), self (oneself), and user (other users other than oneself).

<key> data </key> value (703) represents the date that the content is added, and <key> subject </key> value (704) indicates the title of the content.

<key> description </key> value (705) is a description of the content. For example, the user can easily understand and learn the contents by including a detailed description of each part of dance motion in the above data file. The said <key> description </key> supports two versions: Korean version, <key> description_ko </key> and English version, <key> description_en </key> simultaneously. In addition, in case of user produced contents the user can insert directly the description of the corresponding contents in <key> description_user </key>. In conclusion, <key> description </key> is a section script in the data file added by content producers in order for users to easily use the contents.

<key> blendType </key> value (707) indicates the target gender for which the video content is produced, the types of gender includes boy (men only choreography), girl (women only choreography), mixed (men/women choreography), none (irrespective of gender) and etc. <key> level </key> value (708) indicates the difficulty level that the user has in learning and practicing the video content, and the number can be used to represent the levels, e.g. −2 (very easy), 1 (easy), 0 (normal), 1 (difficult), 2 (very difficult) as expressed by using the number.

Hereinafter, with reference to FIG. 14 the said property list (700) is described as follows.

As shown in FIG. 14, <key> time </key> value (709) represents the playback time of the video content, and <key> genre </key> value (710) represents the genre of the video content.

In addition, <key> previewimage </key> value (711) indicates a URL (Uniform Resource Locator) of the thumbnail image for the corresponding video content, thumbnail images from 1 image at least up to 5 images at maximum can be entered based on the directory in which the corresponding video content is stored. The said thumbnail image represents a specific section of the video content and helps users to understand the content of specific sections in the video content without actual playback.

<key> startMargin </key> value (712) indicates a position at which music or choreography starts in the corresponding video content file and the unit of entered value is time.

<key> bpm </key> value (713) represents the number of bpm (beat per minute) inserted in the video content. As described above, bpm is a method of inserting cue-points in the present invention to allow editing of the video content divided by the number of beats inserted.

<key> fps </key> value (714) indicates frames per second (Frame Per Second) of the video content. The said frames per second is the number of images required to play the video for 1 second and if <key> fps </key> is 60, for example, 60 images are played during 1 second.

<key> video </key> value (715) indicates a URL (Uniform Resource Locator) of the original video file based on the corresponding content directory, the address of the original movie file played with a data file. For example, the address of the original video file in the corresponding directory is given by displaying the name and extension like gangnamStyle.mp4.

Hereinafter, with reference to FIG. 15 the said property list (700) is described as follows.

As shown in FIG. 15, <key> data </key> value (716) represents the entire video content (All). The sections of the video content in the present invention consist of action (Action) (719), verse (Verse) (718), part (Part) (717), and the whole (All) (716) units based on the insertion of cue-points. In addition the whole (716) consists of multiple parts (717); the part (717) consists of multiple verses (718); and the verse (717) consists of multiple actions (719).

Each section of the video content is divided by the <array> </array>, the structure of the video content is to use the <array> </array> inside the <array>. That is, the <array> </array> is an action unit, <array>, <array> </array>, </array> is a verse unit, and <array>, <array>, <array> </array>, </array>, </array> is a part unit. In addition, each unit can include several sub-units within the respective unit.

In addition, <integer> number </integer> value (720) represents the cue-point insertion time (beat in case of the present invention) and the property list file (700) in FIG. 13c contains an action unit consisting of four beats.

Figure 16:
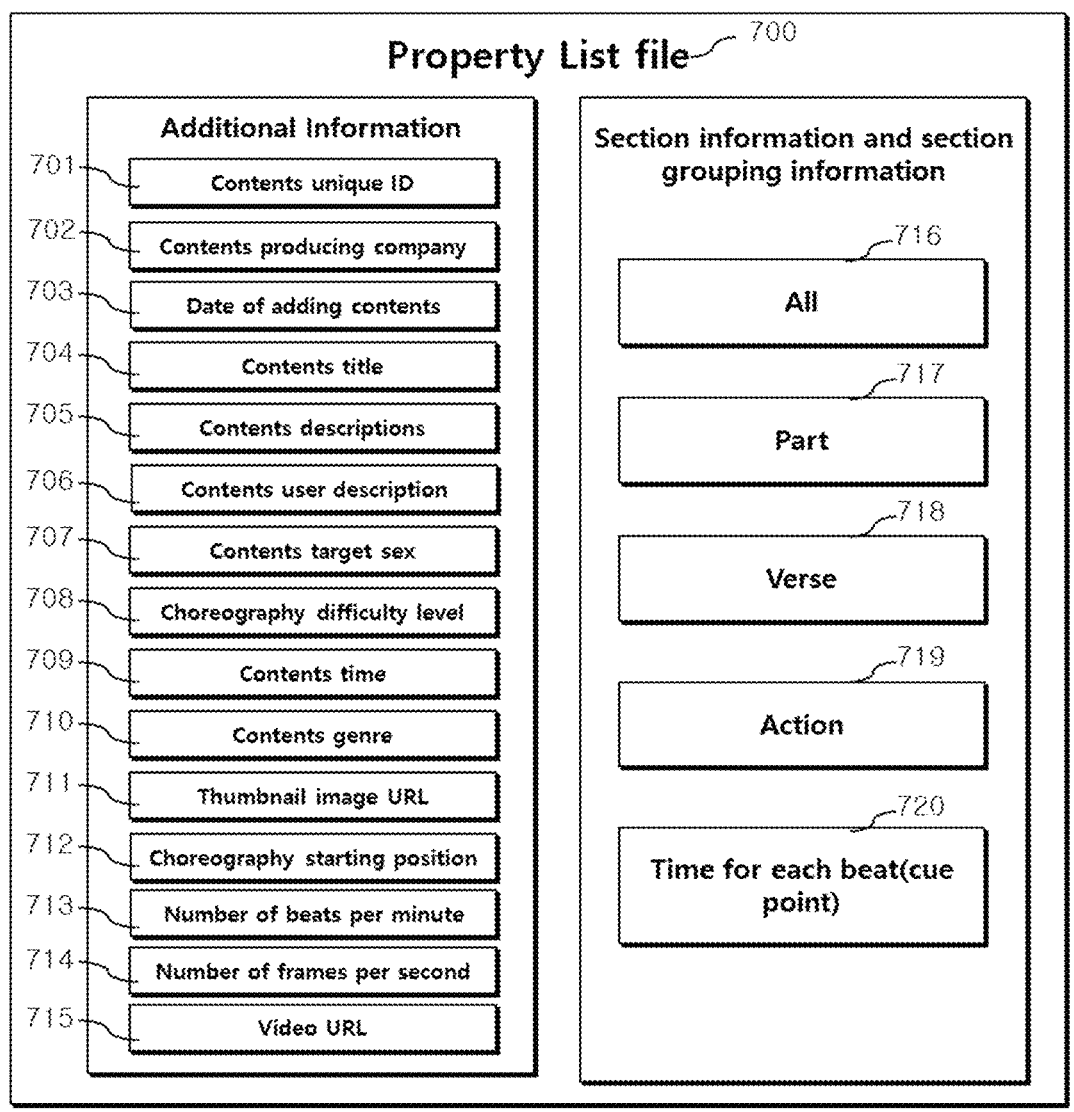
FIG. 16 is an exemplary diagram for explaining the structure of a data file for the video content in accordance with an embodiment of the present invention.

FIG. 16 is an exemplary diagram for explaining the structure of a data file for video content in accordance with an embodiment of the present invention. The configuration of the video content data file is drawn to clearly illustrate the content of the data file explained in FIG. 13 to FIG. 15 and the components of the configuration can be added or deleted depending on the content of the data file.

As shown in FIG. 16, the data file for video content (700) primarily consists of additional information, section information, and section grouping information.

The said additional information includes a unique ID for content (701), content producer (702), date of the content addition (703), title of content (704), description of content (705), content user description (706), appropriate gender (707), choreography difficulty level (708), content time (709), content genre (710), thumbnail image URL (711), choreography starting position (712), number of beats per minute (713), number of frames per second (714), video URL (715).

In addition, the said section information and grouping information include a whole (All) (716), part (Part) (717), verse (Verse) (718), action (Action) (719), time per beat (or per cue-point) (720).

Figure 17:
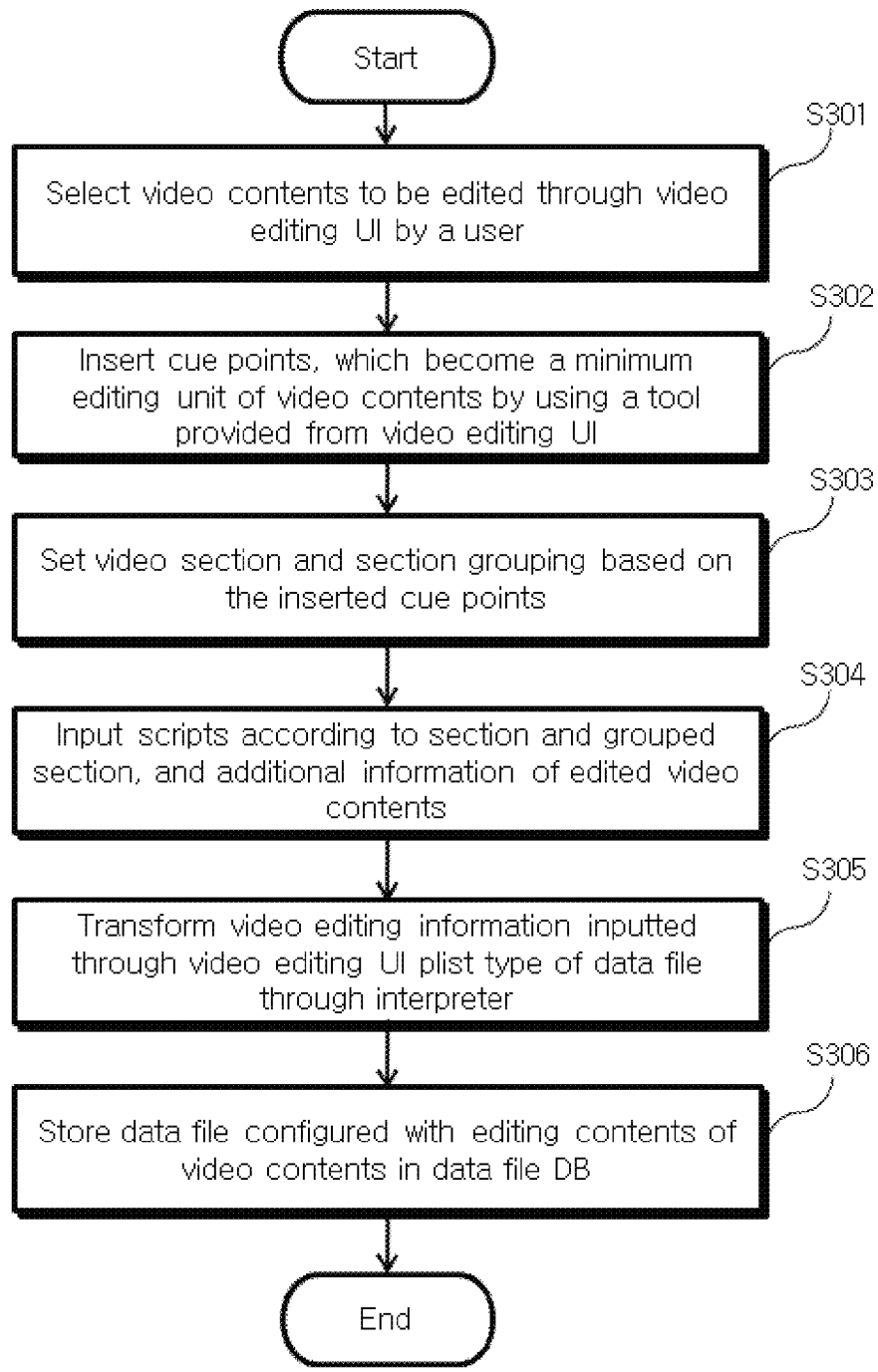
FIG. 17 is a flow chart for explaining the editing process of the video contents in accordance with an embodiment of the present invention.

FIG. 17 is a flow chart for explaining the editing process of the video contents in accordance with an embodiment of the present invention.

As shown in FIG. 17, the editing process of the video contents in accordance with an embodiment of the present invention is first for the user to select a video content to edit from the video content editing UI (S301). The said selected video content is edited with the editing tools provided in the video content editing UI and firstly the cue-points, the minimum unit of editing video content, are inserted (S302). Then a user can set up sections of the video content based on the inserted cue-points and group the sections according to the content of video and one's editing intention (S303). In addition, the user enters scripts including the description of content according to the above sections and grouped sections and one's comment, and additional information about the entire video and each section (S304). The inserted editing information of video content is converted into a data file of property list type by the interpreter (S305) and the editing process of the present invention has been completed by saving the file in the data file DB (S306).

Figure 18:
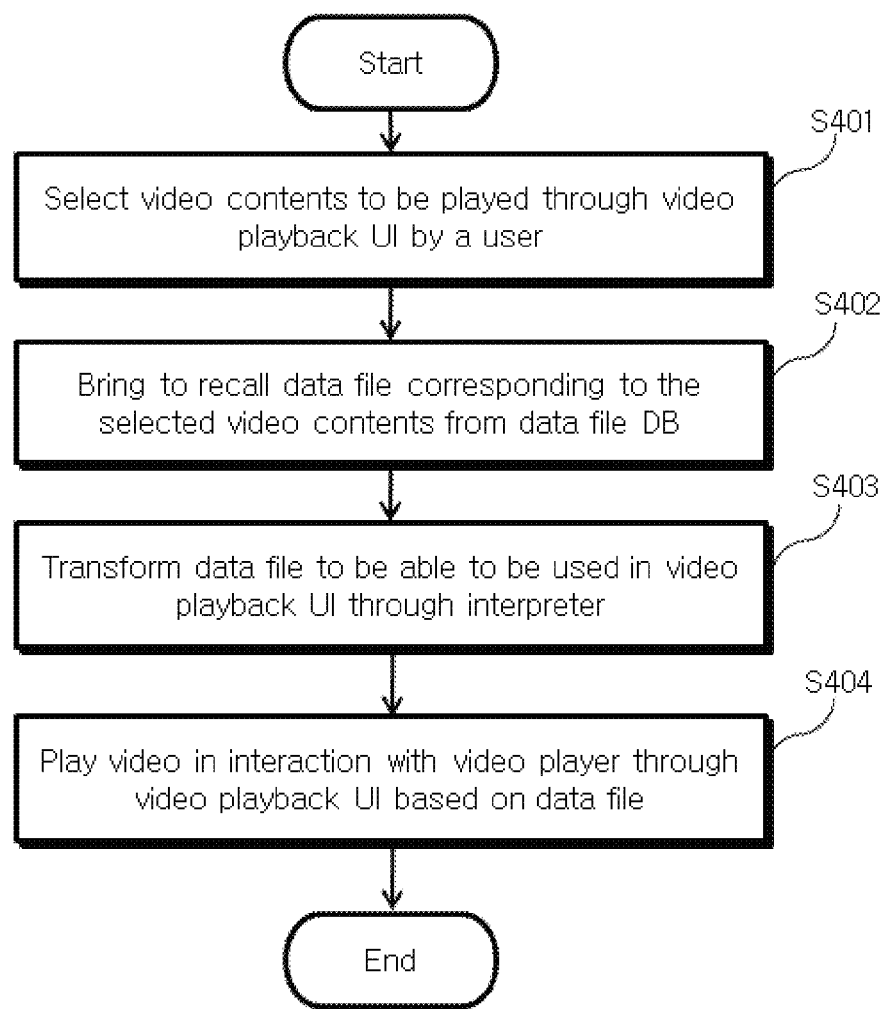
FIG. 18 is a flow chart for explaining the playback process of the video contents in accordance with an embodiment of the present invention.

FIG. 18 is a flow chart for explaining the playback process of the video contents in accordance with an embodiment of the present invention.

As shown in FIG. 18, the playback process of the edited video content in accordance with the present invention is first for the user to select a video content to play from the video content playback UI (S401). The said video content playback UI requests to the data file DB the data file for the select video content (S402) and the requested data file is converted by the interpreter to be used in the video content playback UI (S403). Then, the user can play the edited video contents based on the said data file by interacting with the video player through the video playback UI (S404).

The present invention has been described above with reference to an embodiment shown in the figures, which is exemplificative only and the various and equivalent embodiments are possible by those who have ordinary knowledge in the area the present invention belongs to. Therefore, the technical scope of the present invention will be determined by the claims below.

What is claimed is:

1. A platform apparatus of providing video contents, the platform apparatus comprising:
   a platform server for providing application programs comprising a choreography creation application program enabling creation of the video contents as a choreography different from an original video contents without altering the original video contents; and
   a database for storing said video contents and at least one selected from the group consisting of editing information associated with the video contents, playing information associated with the video contents, and distribution information associated with the video contents, wherein said video contents comprises choreography,
   wherein said choreography creation application program is configured to:
      input the editing information, which comprises at least one selected from the group consisting of cue point information, section information and section grouping information;
      generate a data file containing said editing information; and
      store said data file on at least one selected from the group consisting of an internal storage device, an external storage device, a network storage device, and a virtualized storage of a cloud computing network connected on network,
   wherein the editing information comprises choreography difficulty level, choreography starting position, number of beats per a minute, and number of frames per a second,
   wherein the cue point information is a minimum unit of the section for the video contents, and which is a data segment located between images of the video contents by inserting a periodical signal equivalent to a music beat, wherein the section information is information for dividing the video contents into sections according to PART, VERSE or ACTION, and the sections are periodically or non-periodically grouped so as to edit the grouped video contents, wherein the data file represents the entire video contents and consists of multiple parts, in which each part consists of multiple verses, in which each verse consists of multiple actions, wherein the data file describes choreographic motions for creating the choreography as the video contents, and wherein said choreography creation application program is further configured to enable editing of the choreography to be edited by inserting cue-points and dividing the choreography into sections according to the content of the choreography, setting up different playback speed for each grouped section, setting up playback delay time for a user to easily repeat the choreography, and playing repeatedly specific motion of difficulty.

2. The platform apparatus of claim 1, wherein said choreography video contents creation application program is configured to enable creation of said video contents in compliance with a standard of said platform apparatus for providing video contents through a choreography creation utility, and is configured to enable to archive and manage said created video contents through a choreography archive.

3. The platform apparatus of claim 1, wherein said platform server further provides a video contents distribution application program enabling delivery or distribution of said video contents, or the combination thereof;

wherein said video contents distribution application program is configured to enable users to share said video contents in a social networking service;

to enable provision of hot issue information, a popular video contents chart or a contents provider chart, comprising information related to introduction of new choreography and rookie choreographer and the information related to events and workshops; or to enable the combinations thereof.

4. The platform apparatus of claim 3, wherein the platform server further provides at least one service selected from the group consisting of playing for said video contents and distribution for said video contents; and wherein said platform server provides the video contents distribution application program enabling at least one selected from the group consisting of delivery of said video contents and distribution of said video contents.

5. The platform apparatus of claim 1, wherein said platform server further comprises to be configured to extract statistical data based on at least one selected from the group consisting of a user's feedback information from comment, liked, ranking, and recommendation of said video contents, and wherein said platform server provides a video contents ranking chart of specific themes to a user.

6. The platform apparatus of claim 1, wherein the platform server is configured to interpret the editing information and convert details of said editing information into a property list file.

* * * * *